United States Patent [19]

Oliveto, II et al.

[11] Patent Number: 5,507,536
[45] Date of Patent: Apr. 16, 1996

[54] SELF SEALING INSERT BARB FITTING (SIBLINK)

[76] Inventors: Michael J. Oliveto, II, 811 H Hideaway Bay La.; Michael J. Oliveto, III, 1202 Lake Mallard Blvd., both of Mt. Pleasant, S.C. 29464

[21] Appl. No.: 303,933

[22] Filed: Sep. 9, 1994

[51] Int. Cl.⁶ .................................................. F16L 5/00
[52] U.S. Cl. ........................ 285/196; 285/5; 285/197; 285/184
[58] Field of Search .................................. 285/197, 156, 285/5, 162, 196, 206, 207, 208, 184

[56] References Cited

U.S. PATENT DOCUMENTS

| | | | |
|---|---|---|---|
| 935,984 | 10/1909 | Hinck | 285/208 X |
| 958,876 | 5/1910 | Jones | 285/206 |
| 2,760,824 | 8/1956 | Leadbetter | 285/156 X |
| 2,926,935 | 3/1960 | Marre | 285/184 |
| 3,181,899 | 5/1965 | McKnight | 285/208 X |
| 3,863,960 | 2/1975 | Andersson | 285/162 X |
| 3,879,065 | 4/1975 | Kobayashi | 285/162 X |
| 3,885,743 | 5/1975 | Wake | 285/197 X |
| 3,973,732 | 8/1976 | Diggs | 285/5 X |
| 4,232,421 | 11/1980 | Tucker | 285/162 X |
| 4,637,638 | 1/1987 | Rush et al. | 285/206 X |
| 4,706,999 | 11/1987 | Hynes | 285/197 X |

FOREIGN PATENT DOCUMENTS

| | | | |
|---|---|---|---|
| 100185 | 1/1937 | Australia | 285/206 |
| 2269673 | 11/1975 | France | 285/196 |
| 2337486 | 1/1977 | France | 285/162 |
| 272012 | 9/1989 | Germany | 285/206 |

*Primary Examiner*—Dave W. Arola

[57] ABSTRACT

An improved supply line fitting, installation method and technique for direct installation in the supply lines of a distribution system. An angularly flanged, resilient insert barb being force fitted into an opening in a supply line, seals the opening at three points upon being compressed by an external sealing washer and locking assembly. The locking assembly utilizes an intermediate pressure plate for smooth, distortion free compression, providing a positive internal and external seal of the supply line, and locks the fitting at any point along it's 360 degree rotational axis in preparation for interconnection to a final output device.

12 Claims, 3 Drawing Sheets

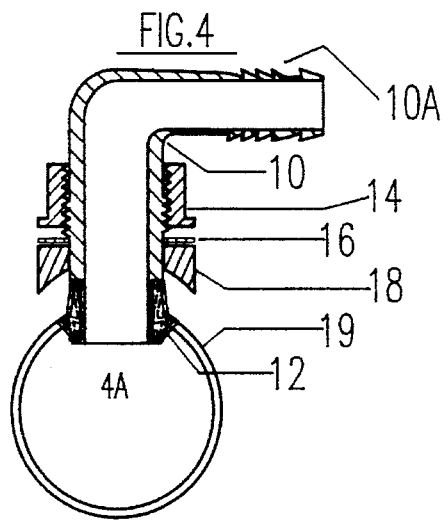
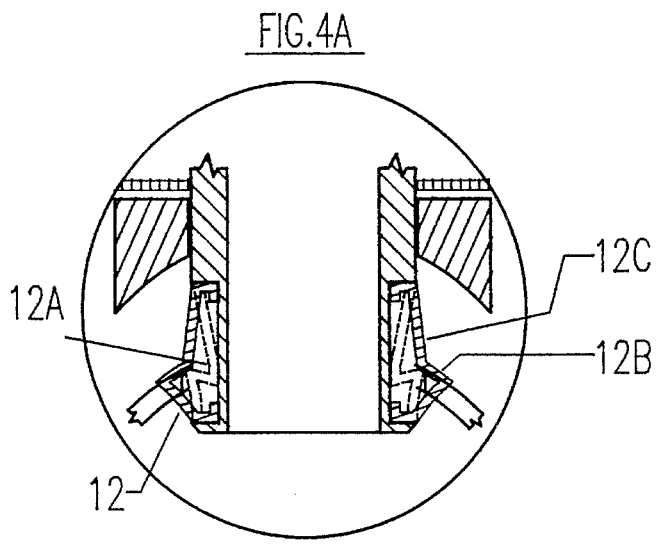
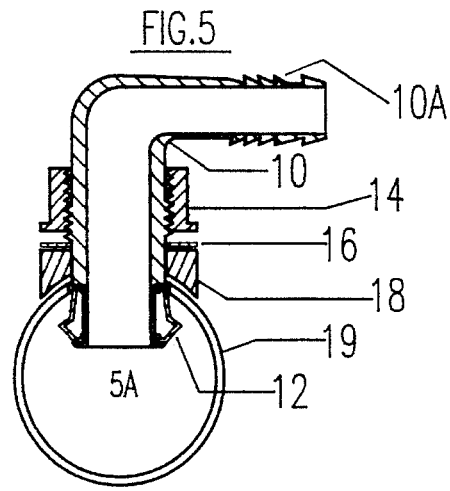
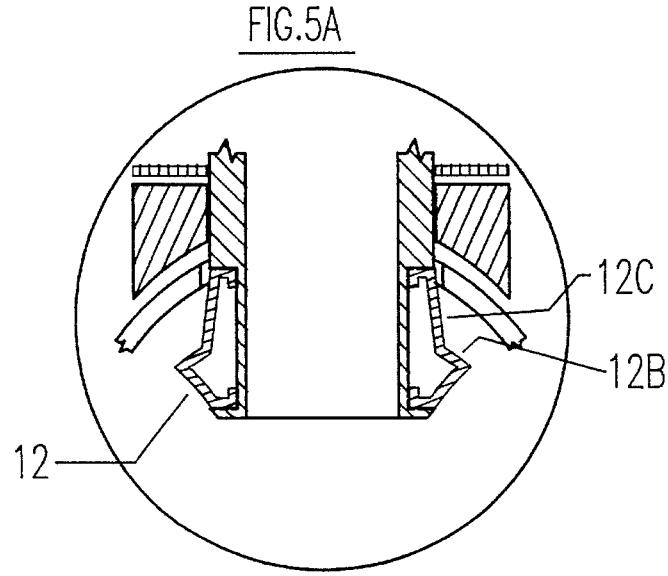
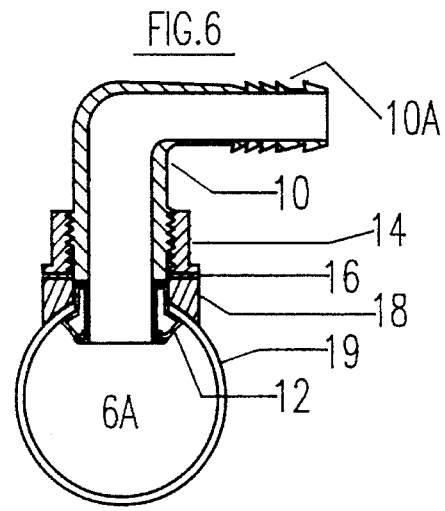
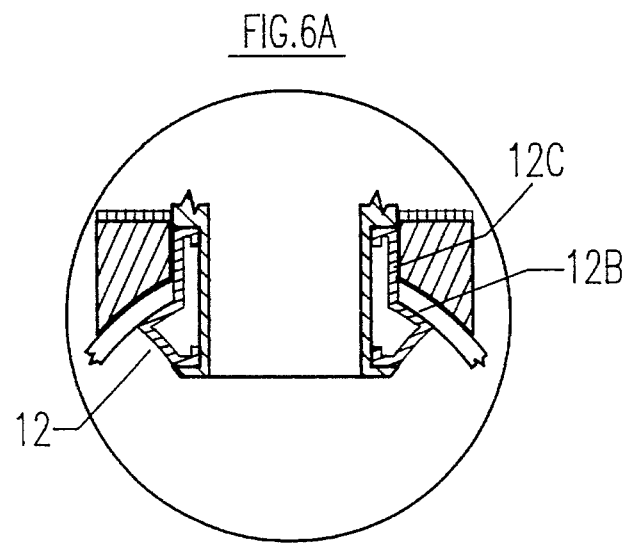

SELF SEALING INSERT BARB FITTING (SIBLINK)

BACKGROUND—FIELD OF INVENTION

This invention relates to improvements in irrigation supply line interconnection fittings, methods and techniques used in the installation, modification, repairs or renovations of lawn and tuff irrigation systems as well as other applications of liquid transference.

BACKGROUND—DESCRIPTION OF PRIOR ART

Lawn and turf irrigation systems are generally comprised of underground water supply lines to which a variety of sprinklers, sprays and drip irrigation techniques and equipment are interconnected. These interconnections are generally of the fixed riser or rotational hard piped swing joint types, with a more recent method using a flexible interconnection pipe.

The primary purpose of these interconnections is to enable the installed output device to be leveled with the landscapes final grade, easily, inexpensively and quickly, in such a manner that damage to the sprinkler systems devices will be minimized, if not totally eliminated, when run or passed over by lawn maintenance equipment or vehicular traffic. Contact of this type produces a downward or lateral force directly affecting supply line interconnections causing line ruptures and breaks, resulting in water waste and expensive system repairs, particularly when fixed or flexible risers are utilized.

Sprinkler supply line interconnections have improved from copper risers to fixed and variable length plastic risers and subsequently to flexible risers; inherent in each are problems and disadvantages resulting in supply line damages and potential pedestrian injury. As prior art advanced, various types of pivoting or swing joint connections evolved around solid, fixed and rotational interconnection components allowing sprinkler devices to be positioned easier and more accurately. More recently a prior art method of sprinkler interconnections via a highly flexible interconnecting pipe providing the utility of installation ease, accuracy and relatively low cost, has all but replaced many of the previous prior art interconnection methods and techniques.

Despite prior art advances in interconnection materials and techniques, all prior art dictates that a tee be installed or cemented into an irrigation systems supply line at each location where a sprinkler or other output device is to be interconnected. This requisite tee provides the positive seal between the supply line and the conduit or interconnecting link and ties the output device directly to the supply line.

All prior art, whether solid swing joints, nipples, risers or the more current technique utilizing a flexible interconnecting pipe, requires the installation of the essential tee fitting, FIGS. 1 and 2, into the systems supply lines for the express purpose of interconnecting a sprinkler or other output device. The installation of the requisite tee with its larger than normal trench excavations, increased material, labor, installation costs and system startup delays, due to chemical solvent curing times, all have a direct bearing on final consumer costs. Additionally, increased exposure to and breathing of noxious, toxic and flammable vapors emanating from chemical primers and solvents required to solvent weld pipes and fittings together during prior art installations, are harmful to all handling or utilizing these elements. Safety and health issues to these chemicals are addressed by the department of health and environmental control [dhec] and the chemicals manufacturers, who issue material safety data sheets [msds], [appendices A and B], requiring all those using or handling these solvents to understand their inherent dangers. Any new process or technique reducing exposure to these chemicals will significantly contribute to the users health and safety. It is this process and the requisite tee that the preferred embodiment addresses.

It is an object of the present invention to reduce or eliminate the need for certain prior art materials, processes, methods and techniques and provide a self sealing and locking fitting for direct installation into a systems supply lines, providing a direct interconnecting link between the supply line and its corresponding sprinklers or output device. Advantages of the preferred embodiment will become apparent after a detailed review of prior art installation methods, materials and techniques.

DETAILED DESCRIPTION OF PRIOR ART

All prior art installation methods, techniques and processes utilize one of two supply line installation techniques, The first widely used method requires excavation of a series of geometrical trenches suitable in length, width, depth and location for proper installation of the varying pipe sizes used in an irrigation systems design. The second method requires that pipe be pulled or plowed beneath the surface at a specified depth by means of a vibratory plow. The vibratory plows keel type blade is hydraulically forced beneath the soils surface while receiving a high speed vibration from the machine as it pulls a length of pipe connected to its blade in the direction of its travel, reducing installation time, costs and damage to existing landscapes.

To fully appreciate the advantages of the preferred embodiment, it is necessary to describe in detail the installation methods, materials and techniques of prior art as typified in FIGS. 1 and 2. With polyvinlychloride pipe and the excavation installation method, supply line sections normally made of polyvinylchloride, but can be of other materials, are solvent welded to form a contiguous supply line and placed in or adjacent to the excavated trench. FIG. 1 shows a partial section of a typical prior art polyvinylchloride tee interconnection installation and assembly. A polyvinylchloride supply line 20 previously layed in and parallel to the bottom of an excavated trench 32 is removed from and placed adjacent to the top of trench 34. If a vibratory plow is utilized to pull the pipe, a hole of sufficient size is dug at the appropriate location along line 20, and the installation is accomplished within this excavation.

Line 20 is cut through at the location where a polyvinylchloride tee 26 is to be installed and the exterior ends of line 20 and interior ends of tee 26 are chemically cleaned and primed in preparation for accepting a bonding solvent. The bonding solvent is applied to the exterior of one end of line 20 and to the interior of one end of tee 26. Tee 26 is fitted over the end of solvent coated line 20 until firmly seated against interior pipe stop 26A. Tee 26 is rotated 90 degrees to distribute the bonding solvent evenly between line 20 and tee 26 and to reposition tee 26 to its permanently bonded position. Tee 26 is held in position until initial bonding between line 20 and tee 26 occurs. With solvent welding completed on one side between line 20 and tee 26, the process is repeated on its opposite side with tee 26 being held firmly in place and line 20 rotated for even solvent distribution. The entire process of cutting, cleaning, priming, applying solvent and fitting is continued until all required interconnecting tees are installed along line 20 providing a contiguous supply line.

With all interconnecting tees installed in line 20, a prior art male threaded spiral barbed fitting 22, generally in the shape of a ninety degree elbow, but may be in other shapes, is threaded into the female threaded end 26B and tightened securely, ensuring that barbed end 22A is rotated to face the desired direction for its final interconnecting link. A length of flexible interconnecting pipe 24 is forced over end 22A until fully seated, leaving a sufficient length of pipe 24 to link it to its output device. Pipe 24 can be installed either after each tee 26 has been solvent welded or after the entire supply line has been fitted with the requisite tees. Based upon the manufacturers specifications, a 12 to 24 hour curing time is required prior to pressurization, testing and use of the supply line.

With polyethylene pipe, where barbed insert fittings are utilized, the process differs in that there are no solvents to apply and additional installation components are required. Barbed fittings are formed by a plurality of ramp type annular grooves forming a series of sharp annular edges extending away from the open end. The insert fitting is designed for flexible or elastically yielding pipe, such that when it is forced [press fitted] into the ends of pipe, the pipe expands to accommodate the fitting and retracts or shrinks around the barbs forming a sealed rotatable connection, the connector and pipe are thereby locked into essentially a permanent connection. The pipe installation process of either excavation or pulling the pipe is identical to that previously covered, with the installation of the connecting tees somewhat easier, although materially more expensive.

FIG. 2, shows a partial section of a typical prior art polyethylene tee interconnection installation and assembly. A polyethylene supply line 21 previously layed in and parallel to the bottom of an excavated trench 32 is removed from and placed on top of and adjacent to trench 34 in preparation for its requisite tee installation or if the excavated trench is large enough the installation process is accomplished within the trench. If a vibratory plow is utilized to pull the pipe, a hole of sufficient size is dug at the appropriate location along line 21, and the requisite tee installation is accomplished within this excavation. Line 21 is cut through at the desired location where an insert barbed tee 28 is to be installed, both ends are separated and insert compression clamps 30 are slipped over and down each end of line 21. Tee 28 is forced, [pressed fitted], into one end of line 21 until it is seated firmly against pipe seat 28A and rotated to allow the female threaded opening 28B to be at its final interconnect position. With tee 28 installed on one side of line 21, the process is repeated on its opposite side with tee 28 being held firmly in place and line 21 forced over the barbed end of tee 28. With line 21 installed over both ends of tee 28, clamps 30 previously slid over and down each end of line 21, are repositioned over and midway between the barbed rings of tee 28 and compressed tightly to ensure a water and pressure proof seal between line 21 and tee 28. This process of cutting, fitting and clamping is continued until all required interconnecting tees 28 are installed along line 21 providing a contiguous supply line.

With all interconnecting tees installed along line 21, a prior art male threaded spiral barbed fitting 22 is threaded into opening 28B and tightened securely, ensuring that barbed end 22A is rotated to face the desired direction for its final interconnecting link. A length of flexible interconnecting pipe 24 is forced over end 22A until fully seated, leaving a sufficient length of :pipe 24 to link it to its final output device. Pipe 24 can be installed either after each insert tee has been installed, or after the entire supply line has been fitted with the requisite tees. Insert fitting installations and procedures, allows for immediate pressurization, testing and use as there are no solvent curing times delaying the systems startup.

OBJECTS and ADVANTAGES

Accordingly, several objects and advantages of our invention are:

(a) to provide a positive, easily installed sprinkler interconnection fitting (b) to provide a sprinkler interconnection fitting that significantly reduces material costs (c) to reduce both installation time and labor costs associated for sprinkler interconnections (d) to provide an easy to use process of supply line interconnections.

(e) to provide a technique that decreases system pressurization and startup operation times.

(f) to provide an installation technique that reduces the need for large installation excavations (g) to reduce exposure to hazardous chemicals and solvents inherent in prior art processes Further objects and advantages of our invention will become apparent from a consideration of the drawings and ensuing description.

BRIEF DESCRIPTION OF THE DRAWINGS

FIG. 4 is a cross section of the preferred embodiment detailing the moment of maximum compression of the self sealing insert barb through a predrilled hole in a supply line.

FIG. 4A is an enlarged view of the self sealing insert barb at the moment of maximum Compression through a predrilled hole in the supply line.

FIG. 5 is a cross section of the preferred embodiment detailing the full insertion of the self sealing insert barb through a predrilled hole into the supply line.

FIG. 5A is an enlarged view of the self sealing insert barb upon full insertion through a predrilled hole in the supply line.

FIG. 6 is a cross section of the installed preferred embodiment detailing the locked in position of the assembly.

FIG. 6A is an enlarged view of the installed self sealing insert barb.

REFERENCE NUMBERS IN DRAWINGS

Figure 1:
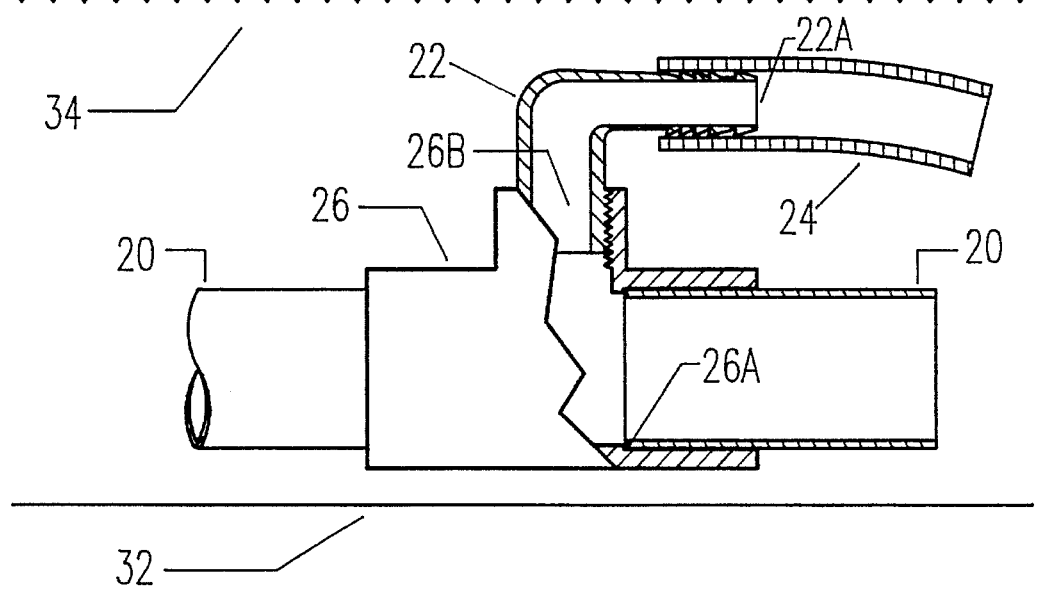
FIG. 1 shows a partial section of a typical prior art polyvinylchloride tee and flexible pipe interconnection installation and assembly.
Figure 2:
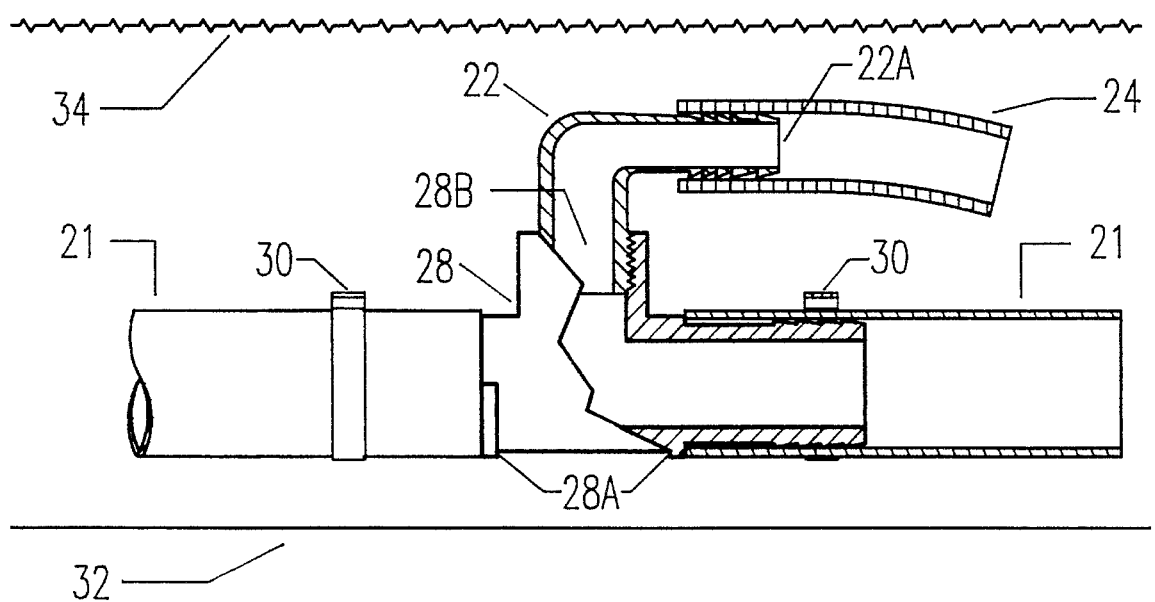
FIG. 2 shows a partial section of a typical prior art polyethylene tee and flexible pipe interconnection installation and assembly.

10 Preferred embodiment Housing
10A Preferred embodiment Barbed end
12 Self sealing insert barb
12A Maximum contraction of self sealing insert barb 12B Self sealing insert barb flange
12C Self sealing insert barb shank
14 Exterior locking ring
16 Exterior pressure plate
18 Exterior sealing washer
19 Liquid supply line
20 Polyvinlychloride supply line
21 Polyethylene supply line
22 Prior art flexible interconnecting spiral barb fitting
22A Prior art spiral barbed end
24 Flexible interconnecting pipe
26 Prior art polyvinyl chloride tee
26A Polyvinylchloride tee pipe stop
26B Polyvinylchloride female threaded opening
28 Prior art insert barb tee
28A Prior art insert tee pipe stop
28B Prior art insert tee female threaded opening
30 Insert fitting compression clamp
32 Bottom of excavated trench
34 Top of excavated trench
36 Sides of excavated trench

SUMMARY OF THE INVENTION

An improved interconnecting supply line fitting, installation method and technique for use primarily in irrigation systems with adjunctive applications in other areas of liquid transference. In accordance with the primary objective, the present invention embodies a self sealing, locking insert barb fitting with a means to seal and lock the fitting into position once fully inserted into a supply line.

The current invention is comprised of a fitting having five essential components, the primary base fitting [housing], an external sealing washer, a pressure plate, an external locking ring and the self sealing insert barb. The primary base fitting, made of an injection molded thermoplastic material, has bonded to one end, resilient, tapered, self sealing insert barb, made of an injection molded elastomer, which will contract upon insertion into a supply line, through a predrilled hole of predetermined size, and expand to its original size and shape upon full insertion into a supply line. The opposite end of the base fitting has a tapered barbed section, sized to allow a length of flexible interconnecting pipe to be forced fitted over the end of the fitting, forming a watertight and pressure proof seal around the fitting. Molded into the base midway between opposite ends of the fitting, are male pipe threads to allow the tightening of the external locking ring. The concaved exterior sealing washer, made of injection molded elastomer fits accurately over the supply line and precisely around the smooth shaft of the base fitting. When tightened or pressed down by pressure from the external locking ring and locked into position, its juxtaposition with the self sealing barb forms a watertight seal in and around the perimeter of the predrilled hole. A pressure plate is sandwiched between the exterior locking ring and the exterior sealing washer to distribute pressure evenly and smoothly over the surface of the exterior sealing washer while tightening the locking ring.

In operation, the fittings self sealing insert barb is forced through a predrilled hole in a supply line. The fitting is rotated to any point about its 360 degree axis, ensuring that the tapered barbed end is in position for its final interconnecting link. The exterior locking ring is threaded down the male pipe threads of the base fittingforcing the pressure plate against the exterior sealing washer. Continued tightening of the exterior locking ring sandwiches the supply line between the fittings self sealing insert barb and the compressed exterior seating washer, locking the fitting in place and ensuring a watertight and pressure proof supply line interconnection. The locked in fitting then allows liquid transference from the supply line through the fitting to an output device via a flexible interconnecting line connected to its tapered barbed end, quickly and easily without the high material and labor costs associated with the installation of prior art installation methods, materials and techniques.

DETAILED DESCRIPTION OF PREFERRED EMBODIMENT

For purposes of promoting an understanding of the principles of the current invention, reference will now be made to the preferred embodiment illustrated in the drawings and specific language will be used to describe the same. It will never the less be understood that no limitations of the scope of the invention is thereby intended, there being contemplated such alterations and modifications of the illustrated device and such further applications of the principles of the invention as disclosed herein, as would normally occur to one skilled in the art to which this invention pertains.

FIGS. 3,4,5,6 & 7 along with the following description, displays the preferred embodiment in detail and illustrates the ease of installation, reduced installation time, lower labor and material costs and increased safety features due to the reduced exposure to the hazardous chemicals required in the installation of prior art materials, methods and techniques.

Figure 3:
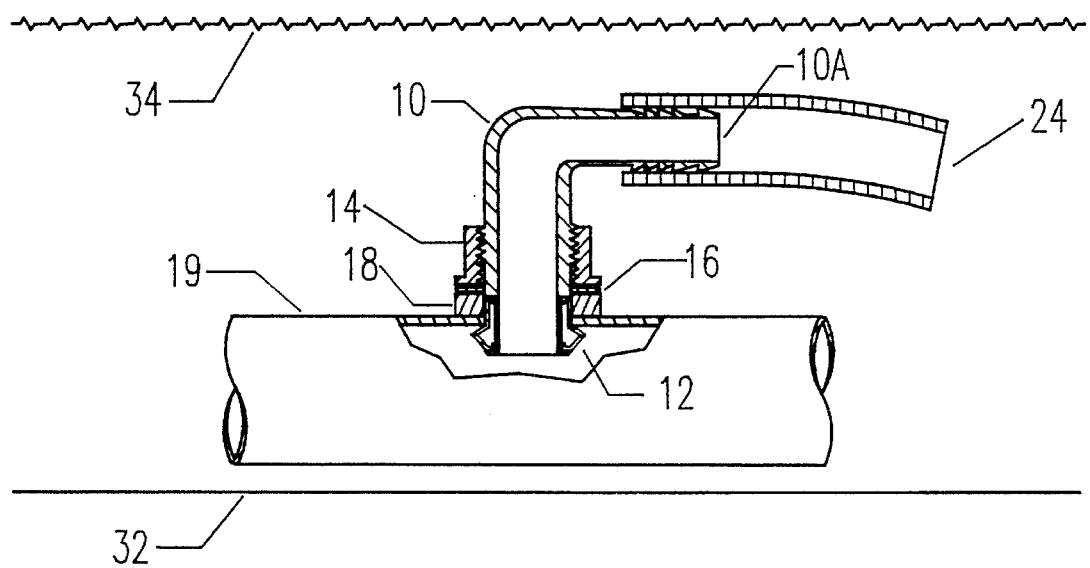
FIG. 3 shows a partial section of the installed preferred embodiment.
Figure 7:
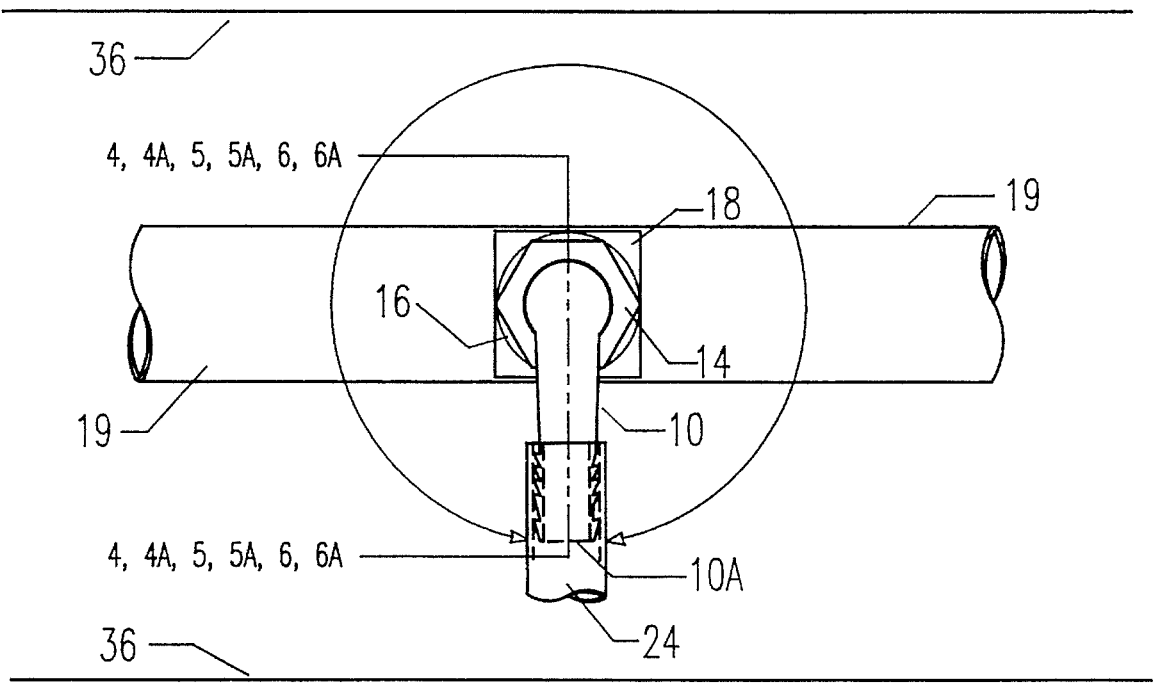
FIG. 7 shows a top view of the preferred embodiment depicting its 360 degree rotational axis and directional cross section for FIGS. 4, 4A, 5, 5A 6, and 6A

FIG. 3 shows the preferred embodiment installed in a liquid supply line 19 made of any material suitable for liquid transference, that has been previously layed in and parallel to the bottom of an excavated trench 32 The preferred embodiment has been designed to be installed within an excavated trench. If a vibratory plow is utilized to pull the pipe, a hole of sufficient size is dug at the appropriate location along line 19 and installation of the preferred embodiment is accomplished within this excavation.

A hole of predetermined size is drilled into line 19 with a standard sized drill bit at the appropriate location along line 19 where an interconnection is desired. FIG. 4 shows the external locking ring 14, fully threaded up the preferred embodiments housing 10 maximizing the distance between exterior pressure plate 16, exterior sealing washer 18 and the self sealing insert barb 12. Barb 12 is positioned into predrilled line 19, FIG. 4A, and forced downward causing barb 12 to compress from its fully expanded position to its fully contracted position 12A between line 19 and housing 10. FIGS. 5 and 5A show barb 12 forced completely through and into line 19 until barb 12 has returned to its fully extended position. FIG. 6 shows washer 18 and pressure plate 16 slid down housing 10 to rest on top of line The preferred embodiment is rotated to any point along its 360 degree rotational axis, FIG. 7, to its final installation position. Ring 14, FIG.6 is threaded tightly against plate 16 and washer 18 forcing barb 12 to tighten upward against the interior of line 19, sandwiching it between barb flange 12B and washer 18, sealing the interior of line 19 by flange 12B, the inside diameter of the predrilled hole by the barbs tapered shank 12C and the exterior of line 19 by shank 12C and washer 18, thereby both sealing and locking the preferred embodiment into its final watertight and pressure proof position ready for final interconnection.

The simple, rapid process of drilling, inserting and tightening the preferred embodiment is continued until all required fittings are installed in line 19 providing a contiguous unbroken supply line. With all interconnections installed along line 19 a length of flexible interconnecting pipe 24 is forced over barbed end 10A, FIG. 6, until it is fully seated leaving a sufficient length of pipe 24 to link it to its final output device. End 10A described in the preferred embodiment depicts one of several known pipe connection methods.

While we have illustrated and described our invention by means of specific embodiments in the foregoing description and drawings, in such a clear and concise manner, so that those skilled in the art may readily understand and practice the invention, it is to be understood that numerous changes and modifications may be made therein, without departing from the spirit and scope of the invention as defined in the appended claims. While those skilled in the art will conceive of other embodiments of the invention which may be drawn from the disclosure herein and to the extent that such other embodiments are so drawn, it is intended that they fall within the ambit protection provided by the claims herein.

We claim:

1. An insert fitting for a supply line, comprising:

a supply line defined by wall means and having an opening through the wall thereof;

a housing having a first end which extends through said opening into a void in said supply line, said housing;

having an expandable and contractible resilient barb means positioned on said housing and located near said first end and surrounding said first end for sealingly engaging said housing and said supply line, wherein said resilient barb means has a flange near one end of said resilient barb means which is contracted by engagement with said opening upon insertion through said opening and expands after entering said void for sealingly engaging an interior of said supply line, and wherein said resilient barb means has an upper end and said upper end of said resilient barb means extends from said flange through said opening in said supply line to an exterior of said supply line; and locking means positioned on said housing for causing said flange to sealingly contact said interior of said supply line and said barb means to sealingly engage said housing to seal an engagement of said housing to said supply line.

2. An insert fitting in a supply line as described in claim 1, further comprising a sealing washer which is positioned between said supply line and said locking means and which conforms to an exterior surface of said supply line on one side of sealing washer and having a flat surface opposite said supply line.

3. An insert fitting for a supply line as described in claim 2, wherein said upper end of said resilient barb means is tapered.

4. An insert fitting for a supply line as described in claim 2, further comprising a pressure plate which is positioned between said sealing washer and said locking means.

5. An insert fitting for a supply as described in claim 1, wherein said upper end of said resilient barb means is tapered.

6. An insert fitting for a supply line as described in claim 5, further comprising a pressure plate which is positioned between said sealing washer and said locking means.

7. An insert fitting for a supply line, comprising:

a supply line defined by wall means and having an opening through the wall thereof;

a housing having a first end which extends through said opening into a void in said supply line, said housing having threads on an outside thereof and above said first end;

an expendable and contractible resilient barb means positioned on said housing and located near said first end and surrounding said first end for sealingly engaging said housing and said supply line, wherein said resilient barb means has a flange which is contracted by engagement with said opening upon insertion through said opening and expands after entering said void for sealingly engaging an interior of said supply line, and wherein said resilient barb means has an upper end and said upper end of said resilient barb means extends through said opening in said supply line to an exterior of said supply line; and locking means which engages said threads of said housing, wehrein said locking means which is positioned by means of said threads to cause said flange to sealingly contact said interior of said supply line and said barb means to sealingly engages said housing to said supply line.

8. An insert fitting for a supply line as described in claim 7, further comprising a sealing washer which is positioned between said supply line and said locking means and which conforms to an exterior surface of said supply line on one side of said sealing washer and having a flat surface opposite said supply line.

9. An insert fitting for a supply line as described in claim 8, wherein said upper end of said resilient barb means is tapered.

10. An insert fitting for a supply line as described in claim 8, further comprising a pressure plate which is positioned between said sealing washer and said locking means.

11. An insert fitting for a supply line as described in claim 7, wherein said upper end of said resilient barb means is tapered.

12. An insert fitting for a supply line as described in claim 11, further comprising a pressure plate which is positioned between said sealing washer and said locking means.

* * * * *